United States Patent [19]

Martin et al.

[11] Patent Number: 4,546,829

[45] Date of Patent: Oct. 15, 1985

[54] ENHANCED OIL RECOVERY PROCESS

[75] Inventors: Alan B. Martin, Beattyville; Ernest V. Jackson, Lexington, both of Ky.

[73] Assignee: Mason & Hanger-Silas Mason Co., Inc., Lexington, Ky.

[21] Appl. No.: 700,068

[22] Filed: Feb. 11, 1985

Related U.S. Application Data

[60] Continuation of Ser. No. 526,793, Aug. 26, 1983, abandoned, which is a division of Ser. No. 242,372, Mar. 10, 1981, Pat. No. 4,499,946.

[51] Int. Cl.⁴ .................. E21B 43/24; E21B 43/34
[52] U.S. Cl. ..................... 166/267; 166/57; 166/273; 166/274; 166/303
[58] Field of Search ............ 166/57, 266, 267, 268, 166/272, 273, 274, 303

[56] References Cited

U.S. PATENT DOCUMENTS

| | | | |
|---|---|---|---|
| 1,263,618 | 4/1918 | Squires | 166/266 |
| 2,588,296 | 3/1952 | Russell, Jr. | 166/57 |
| 2,734,578 | 2/1956 | Walter | 166/57 X |
| 2,823,752 | 2/1918 | Walter | 166/57 X |
| 2,969,226 | 1/1961 | Huntington | 166/266 X |
| 3,075,918 | 1/1963 | Holm | 166/268 X |
| 3,228,467 | 1/1966 | Schlinger et al. | 166/266 |
| 3,232,885 | 2/1966 | Henke | 166/268 X |
| 3,442,332 | 5/1969 | Keith | 166/272 X |
| 4,007,786 | 2/1977 | Schlinger | 166/266 |
| 4,018,481 | 4/1977 | Terry | 166/267 X |
| 4,118,925 | 10/1978 | Sperry et al. | 166/303 X |
| 4,160,479 | 7/1979 | Richardson et al. | 166/272 X |
| 4,261,420 | 4/1981 | Hitzman | 166/268 X |
| 4,325,432 | 4/1982 | Henry | 166/272 X |
| 4,344,486 | 8/1982 | Parrish | 166/272 |

OTHER PUBLICATIONS

Kaplan, "Cost-Saving Process Recovers CO₂ from Power Plant Fluegas", *Chemical Engineering*, Nov. 29, 1982, pp. 30, 31.

*Primary Examiner*—George A. Suchfield
*Attorney, Agent, or Firm*—Cushman, Darby & Cushman

[57] ABSTRACT

An improved portable, versatile, modular, aboveground system and process for generating combustion gases, principally nitrogen and carbon dioxide, and steam, for removing particulate matter and corrosive components from the combustion gases, and for injecting the purified nitrogen and CO₂, and steam, individually or in selected mixtures, at controlled temperatures and pressures into a subterranean formation bearing hydrocarbons to enhance the recovery thereof. The system includes a high-pressure combustion reactor for efficient generation of combustion gases at the required rates and at pressures up to about 8000 psi and temperatures up to about 4500° F. The reactor is water-jacketed but lined with refractory material to minimize soot formation. Combustion chamber temperature is reduced to a safe level by water injection with the fuel.

32 Claims, 6 Drawing Figures

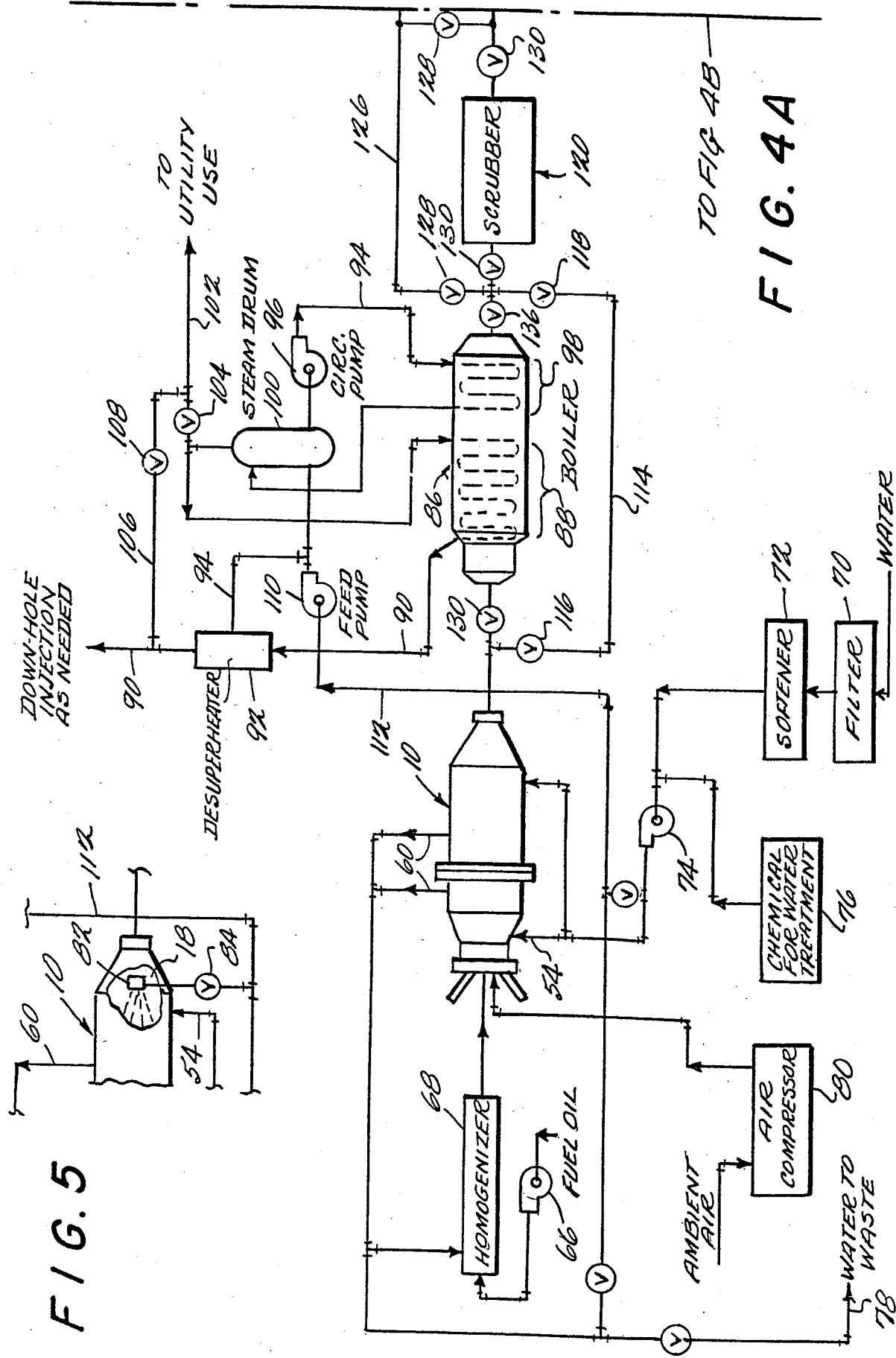

ENHANCED OIL RECOVERY PROCESS

This is a continuation, of application Ser. No. 526,793, filed Aug. 26, 1983, which was abandoned upon the filing hereof, which is a division, of application Ser. No. 242,372, filed Mar. 10, 1981, now U.S. Pat. No. 4,499,946.

FIELD OF THE INVENTION

This invention relates to improved apparatus and process for the enhancement of recovery from a subterranean oil field. More particularly, the invention relates to enhancing recovery by down-hole injection of thermal energy in the form of nitrogen, carbon dioxide and steam, either individually or in selected mixtures, at controlled pressures and temperatures.

BACKGROUND OF THE INVENTION

It is well known that tertiary recovery from an oil field can be enhanced by down-hole injection of nitrogen, carbon dioxide and steam, individually or in selected mixtures, at controlled temperatures and pressures. Such injection may be continuous at an injected well with recovery had at a production well spaced therefrom, or cyclic with recovery at the injected well by the so-called "huff and puff" method. The requirements, as respects such gaseous components and mixtures, as well as temperatures and pressures, vary from field to field. Temperature requirements may vary from a low of 60° F. for miscible flooding of light crudes to a high of 1200° F. for very heavy crudes, but in practice injection temperatures are limited to that which well casing will withstand, i.e., of the order of 1,000° F. Similarly, pressure requirements can be quite high, i.e., up to 8,000 psi, but injection pressures are limited by practical considerations, i.e., the pressure capability of the apparatus employed to generate the gaseous components.

Publications relating to such recovery enhancement are:

"Engine Exhaust Gas Boosts Heavy Oil Recovery", by Norman J. Clark et al, Petroleum Management, August 1964

"Miscible Displacement With Nitrogen", by Michael D. Rushing et al, Petroleum Management, November 1977

"Nitrogen May Be Used For Miscible Displacement in Oil Reservoirs", by Michael D. Rushing et al, JPT Forum—Paper Presented at the SPEAIME Deep Drilling and Production Symposium, Amarillo, Tex., Apr. 17–19, 1977

"Enhanced-Recovery-Inert Gas Processes Compared", by Keith Wilson, The Oil and Gas Journal, July 3, 1978

"Nitrogen-Driven $Co_2$ Slugs Reduce Costs", by J. P. O'Leary et al, Petroleum Engineer International, May 1979.

Various types of apparatus have been proposed, and even constructed and used, for down-hole injection of the aforementioned gaseous components. Among the earliest of such proposals is that disclosed in the patent to Day U.S. Pat. No. 1,342,741, June 8, 1920. Day proposed the above-ground fixed installation of a large high-pressure gas generator or combustion reactor for the projection thereinto, under high pressures, and burning therein of a combustible mixture of oil, or oil and steam, and air, to generate hot pressurized combustion gases for injection down-hole to enhance recovery from bituminous shale or rocks.

The patent to Hixon U.S. Pat. No. 2,173,556, Sept. 19, 1939 and to Baldwin U.S. Pat. No. 3,066,737, Dec. 4, 1962, disclose portable apparatus comparable to that disclosed in Day for the production of combustion gases for down-hole injection at high temperatures and pressures.

Problems arise, however, with apparatus of the type disclosed by Day and Hixon. In particular, combustion under pressure raises flame temperature. At the higher injection pressures contemplated here, e.g., over 1500 psi, flame temperatures may reach 5,000° F. or more. No practical refractories are available which will withstand such temperatures.

The patent to Walter U.S. Pat. No. 2,734,578, Feb. 14, 1956, sought to overcome the high flame temperature problem with a cooling water jacket, which also was used to produce steam, but that only created another problem, i.e. the formation of soot on cooled metal surfaces which is entrained with combustion gases and can readily clog subterranean formation pores, thus greatly inhibiting the benefits otherwise achievable. Accordingly, Walter employed downstream scrubbers to remove the soot before down-hole injection. Walter further discloses, however, various modifications of his apparatus for producing only steam and carbon dioxide ($CO_2$) or nitrogen ($N_2$) and steam for down-hole injection. Walter's combustion reactor used for such selective production, however, differs from and is not interchangeable with that used to produce all three gaseous components, i.e., $N_2$, $CO_2$ and steam. Walter had the further idea, disclosed in his later U.S. Pat. No. 2,839,141, June 17, 1958, of injecting combustion gases together with steam and free oxygen for effecting subterranean in-situ combustion. The steam was produced, however, by a separate boiler heated by a burner or by the exhaust from a prime mover.

Control of flame temperature by means other than a water cooling jacket also is known. The patent to Lange U.S. Pat. No. 3,700,035, Oct. 24, 1972, discloses apparatus for effecting in-situ combustion in subterranean oil fields, like Walter '141, by down-hole injection of combustion gases, steam and oxygen. The combustion gases are generated in a small-volume, high-pressure, water-jacketed combustion reactor fed with oxygen-enriched fuel which generates extremely high flame temperatures. In Lange the flame temperature is reduced and controlled by injecting water directly into the flame thereby reducing its temperature by evaporation. The Lange water injection method, however, could form soot where the water contacted the flame prior to complete combustion. Further, it would seem that the Lange water-jacket also results in soot formation on its inner metal surfaces exposed to the flame, the same as in Walter '578, because Lange uses a bed of small refractory bodies at the outlet of the combustion chamber to filter out entrained solids.

The patents to Hamrich et al U.S. Pat. No. 4,077,469, Mar. 7, 1978, and Rose et al, U.S. Pat. No. 4,159,743, July 3, 1979, both disclose down-hole burners for the generation of combustion gases to enhance recovery from an oil field. The combustion reactors are water-jacketed and in their combustion zones are lined with refractory material. Beyond that zone, however, the metal walls of the jackets are exposed and perforated for the injection of water to cool the hot combustion gases. Again it would seem that objectionable soot would be formed on the exposed parts of the metal walls of the water jackets. Further, down-hole gas generators are necessarily of such small volume that the generation of combustion gases at the required rates cannot be attained.

Present practice usually involves purchase of $CO_2$ and N and to heat and compress such gases at the injection site, a very costly process.

BRIEF SUMMARY OF THE DISCLOSURE

Accordingly, it is an object of this invention to provide an improved portable versatile modular aboveground system and process for on-site generation of combustion gases, principally nitrogen ($N_2$) and carbon dioxide ($CO_2$), and steam, for removing particulate matter and corrosive components from the $N_2$ and $CO_2$, and injecting these three fluids, individually or in selected mixtures and at controlled temperatures and pressures, into a subterranean formation being hydrocarbons and other fluids to enhance the recovery thereof.

This and other objects are accomplished by the provision of a practical, efficient high-pressure combustion reactor or gas generator of a size for efficient generation of combustion gases, comprising mainly nitrogen and carbon dioxide, at the required rates and at pressures up to the order of 8,000 psi and temperatures up to the order of 4,500° F. without the, or with a minimum of, formation of soot. Portability of the reactor is assured by multipart construction, while its design enables the selective use of various fuels, e.g., oil, natural gas, coal, etc. The hot combustion gases are then passed sequentially, selectively, and optionally through portable modular units selectively detachably connectable to the reactor, and to each other, such as a heat exchange type of boiler to generate steam for down-hole injection and/or to produce power, a scrubber for removal of any particulate matter should the fuel create such, a catalytic gas purifier for removal of any corrosive material, e.g., hydrogen sulfide, sulphur, sulphur oxides, nitrous oxides, etc., should the fuel create such, a gas cooler, a gas drier, and a $CO_2$ absorber. A $CO_2$ stripper module can be detachably connected to the absorber for down-hole injection of $CO_2$ only, if desired.

Other objects and advantages of the invention will become apparent from the following description and accompanying drawings, in which:

BRIEF DESCRIPTION OF THE DRAWINGS

FIGS. 4A and 4B are a flow diagram of the system embodying the invention; and

FIG. 5 is an enlarged fragmentary view of a portion of FIG. 4A showing a modified form of the system.

DETAILED DESCRIPTION OF THE INVENTION

Figures 1, 2:
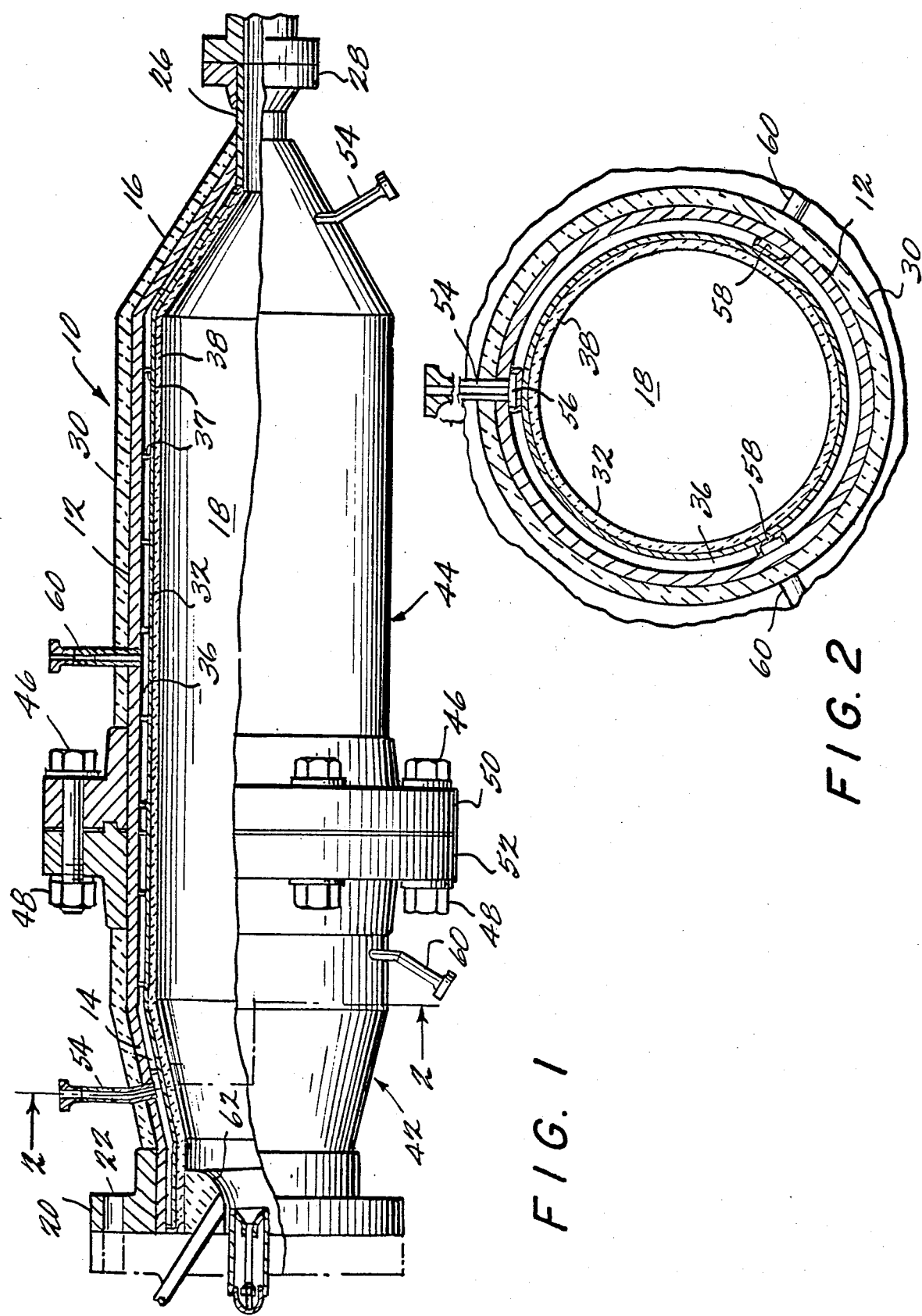
FIG. 1 is a side view, partly in section, of a combustion reactor embodying this invention.
FIG. 2 is a cross-sectional view taken on line 2—2 of FIG. 1.
Figure 3:
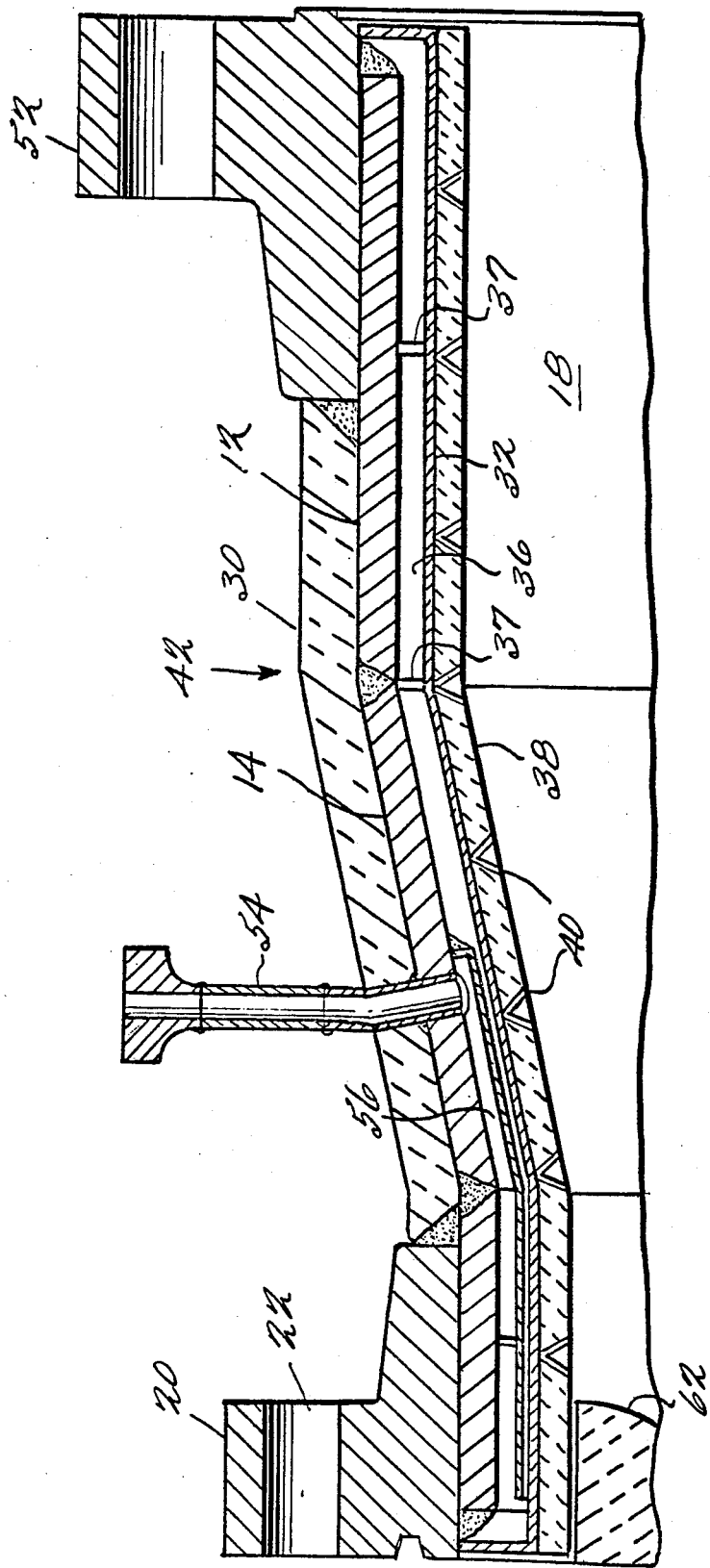
FIG. 3 is an enlarged fragmentary view of a portion of FIG. 1.

Referring now to FIGS. 1-3 of the drawings, there is shown a combustion reactor 10 embodying this invention for generating combustion gases, principally nitrogen and carbon dioxide, at high temperatures, e.g. up to 4500° F., and high pressures, e.g., up to 8000 psi. The reactor 10 comprises an elongated circular steel shell 12, having tapered end sections 14, 16, designed to resist interior pressures of the order contemplated, e.g., up to about 3000 psi. In order to provide a combustion chamber 18 of sufficient volume to generate gases at the required rates, e.g. up to about 3800 scfm, the shell 12 may be of the order of 12-13 ft. in length with a combustion chamber diameter, between the tapered ends 14, 16, of the order of 26". Such dimensions may vary, however, with the combustion chamber internal diameter being in the range of from about 10" to about 60" depending on shell length and gas generation rate requirements. The minimum internal diameter of the chamber 18, i.e. of the order of 10", is somewhat critical because the combustion process of this invention requires a minimum volume of combustion space. To resist the high interior pressures, the shell 12 may have a thickness of the order of $1\frac{1}{2}''$, more or less, dependent on design operating pressure. At one, and larger, end 14 the shell 12 is provided with an exterior flange-like ring 20 provided with a circumferential series of holes 22 parallel to the chamber axis for attachment of accessories, e.g., a burner 24 which projects into the combustion chamber 18. At the other, and smaller, end 16 the shell 12 is provided with a reduced gas-exit tube 26 of the order of 6" inside diameter, to the end of which is secured a flange-like coupling ring 28 for the attachment thereto of various modular units as later described.

The shell 12 preferably is covered with thermal insulation 30 which may be of the order of 2" thick while a thin inner steel shell 32, of the order of $\frac{1}{4}''$ thick, is spaced inward of the outer shell 12, by spacers 34, to form a hollow water jacket 36. The inner surface of the inner shell 32 is lined throughout its length with refractory material 38, preferably of a hydraulic castable type, secured to the shell 32 by prior-installed V-shaped metal retainer elements 40 (FIG. 3) having their apexes secured, as by welding, to the inner side of the shell 32.

To facilitate portability, installation and refractory maintenance in the field, the combustion reactor 10, preferably is constructed in two sections 42, 44 divided on a transverse plane and detachably secured together by bolts 46 and nuts 48 extending through flange-like ring members 50, 52 secured to the adjacent ends of the sections. The two sections 42, 44 may be mounted on suitable supporting structures, e.g., skids (not shown). Each section 42, 44 is provided with a separate hollow water jacket 36 to which water is admitted adjacent one end by a circumferential series, preferably at least three, evenly spaced inlet pipes 54, each of which communicates with a passageway 56, formed by a welded channel, within the jacket 36 that directs the inlet water to the corresponding end of the jacket for flow toward the other end. At such other end, similar passageways 58 communicate with a circumferential series of outlet pipes 60.

The water jacket 36 is not used primarily to reduce flame temperature but mainly to preheat water for purposes later described. In operation water in jacket 36 is, however, maintained at a pressure only slightly lower than that in the combustion chamber 18, say 50 psi lower, to counteract chamber pressure on the inner shell 32. Hence, the strength of the inner shell 32 need not be sufficient to resist full chamber pressure with a consequent permissible reduction in thickness of such shell. The refractory lining 38 is used to eliminate the formation of soot which would take place on the inner surface of the water-cooled inner metal shell 32 if such surface were exposed to the flame and the combustion gases.

At the burner end, the combustion chamber 18 is provided with a thick collar 62 of refractory material with the burner 24 projecting into the throat of the collar. Pressure-tight sight tubes 64 may extend through the collar 62 to view the flame. The burner 24 may be of any conventional construction adapted to burn either liquid or gaseous fuel, e.g., fuel oil or natural gas, and is sealed in place against the escape of combustion chamber pressure there by. The combustible mixture of fuel and air supplied to the burner 24 has an air/fuel ratio such as to minimize the formation of soot. As mentioned before, the absence of cooled metal surfaces exposed to the flame also detracts from soot formation.

Finely divided solid fuel, such as coal slurried or unslurried or crushed, can also be used to fuel the combustion chamber 18. Such solid fuel, however, should be delivered into the chamber 18 with a tangential component to swirl therethrough so that particulate material products of combustion, e.g., slag, will helically traverse the combustion chamber lining 38 toward the restricted gas exit tube 26. Desirably, means (not shown) would be employed to remove such particulate material from the chamber 18 prior to passage with the combustion gases through the exit tube 26.

Figure 4B:
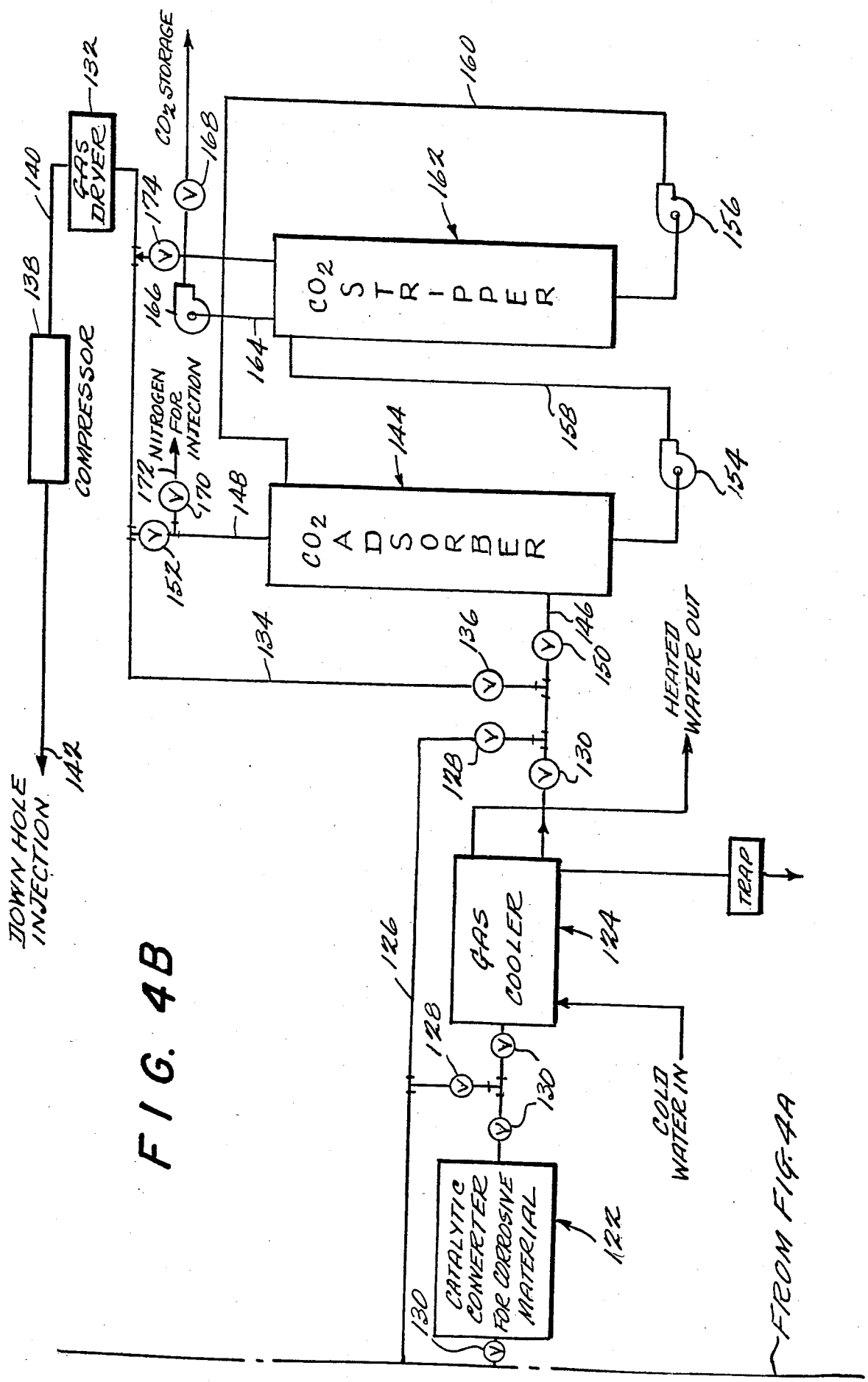

Referring now to FIG. 4 of the drawings, there is shown a flow diagram of a system embodying this invention based on the combustion reactor or gas generator 10. Fluid fuel is supplied under pressure, as by a pump or compressor 66 depending on whether the fuel is a liquid or gas, to the burner 24 from an appropriate source. As mentioned above, when a combustion chamber is operated under pressure, flame temperature rises correspondingly. At combustion pressures of the order of 1500 psi flame temperature may attain 5,000° F. or even higher. No practical refractory material is presently available which can withstand such temperatures. Accordingly a small quantity of water is introduced into the flame to cool it by evaporation and reduce its temperature sufficiently, e.g., to the order of 4000° F. dependent on fuel characteristics, to avoid damage to the refractory lining 38. If the fuel is a liquid, e.g., fuel oil, a small quantity of water or steam is mixed therewith in a sonic or mechanical homogenizer or chemical emulsifier 68 of conventional construction and the homogenized mixture fed to the burner 24. Water for this purpose may be preheated by passage through the water jacket 36 of the reactor 10. Preferably, such water is first passed through a filter 70 and, if hard, through a softener 72 before being fed, as by a pump 74, to the water jacket 36. It also may be desirable, depending on the fuel used, to treat the flame-cooling water with various chemicals, as indicated by the chemical additive source 76, to avoid the production of undesirable materials in the combustion chamber 18. Excess water from the jacket 36, i.e., amounts not needed for flame-cooling and generation of steam for down-hole injection as later described, may be passed to waste, as at 78. In the event the fuel is a gas, e.g. natural gas, the homogenizer 69 is unnecessary and the flame-cooling water or steam is sprayed into the flame along with the fuel.

Air for combustion is supplied to the burner 24 by a conventional air compressor 80. The fuel pump or compressor 66, and the air compressor 80 have the capacity to deliver fuel and air at pressures sufficient to maintain pressure in the combustion chamber 18 up to the order of 3000 psi and at flow rates sufficient to generate combustion gases at the flow rates required. Flame cooling may also be achieved by mixing a small quantity of water or steam with the combustion air prior to introduction into the combustion chamber 18.

Steam injection to enhance recovery sometimes is desirable, although condensation in the subterranean formation sometimes causes water blockage problems. The system of this invention provides alternative sources for steam both of which use the heat of the combustion gases generated in the chamber 18 for steam generation. FIG. 5 shows one source wherein water, preheated in the water jacket 36, is sprayed, as by a removable nozzle 82, into the combustion chamber 18 downstream of the primary combustion zone where it flashes into steam and accompanies the combustion gases for down-hole injection. This steam source is optional, however, so a shut-off valve 84 is provided in the water line to the removable spray nozzle 82, so as to avoid damage from high temperature.

The alternative and preferred steam source is a conventional heat-exchanger type boiler 86 heated by passage therethrough of the hot combustion gases generated in the reactor 10. The boiler 86 is designed to be readily portable, e.g., skid-mounted or wheeled, so as to constitute a module readily connectable to the exit tube 26 of the reactor 10. The quantity and temperature of the steam used for down-hole injection can be controlled much more readily by generation in the boiler 86 than by generation in the combustion chamber 18 by the spray method. Preferably, the boiler 86 has an upstream superheater section 88 from which superheated steam is taken through a line 90 for down-hole injection as needed. Accurate control of the temperature of the injected steam can be had, if desired, by first passing it through an accurately controlled desuperheater 92 from which condensed steam can be bled and recirculated through the boiler 86 through a line 94 which includes a recirculating pump 96. Preferably steam from the downstream section 98 of the boiler 86 is led to an external steam drum 100 before being conducted to the superheater section 88. Optionally steam from the drum 100 can also be used for auxiliary purposes, e.g., to generate power, etc., as indicated by the steam offtake line 102 having a shut-off valve 104 therein. In periods when steam is not needed for down-hole injection, it can be used for auxiliary purposes by conducting it from the injection line 90 through a by-pass 106, having a shut-off valve 108 therein, connected to the steam offtake line 102 downstream of the valve 104. Feedwater is supplied to the boiler 86 by a feed pump 110 connected to the recirculation line 94 in advance of the recirculating pump 96. Preferably the feed pump 110 is supplied, via a line 112, with purified water that has been preheated in the water jacket 36 of the reactor 10. In the event no steam is needed for injection in a particular field, the boiler module 86 can be omitted or by-passed by the combustion gases through a duct 114 having shut-off valves 116, 118 therein.

The aforedescribed structure of the reactor minimizes the production of soot. Nevertheless, during startup, shut-down, or upset some soot might be formed. Even so, such will be mostly eliminated by oxidation of the soot (carbon) to $CO_2$ by the free oxygen liberated by dissociation of the steam from the flame-cooling water, at the involved high temperatures and pressures.

Though the construction of the combustion reactor 10 minimizes the production of soot, the versatility of the system dictates that combustion may be effected with various types of fuels, as described above. The products of combustion of some such fuels may contain particulate matter that would tend to clog subterranean formation pores and accordingly should be removed from the combustion gases before they are injected down-hole. Hence, the system includes a conventional scrubber 120 in the form of a portable module detachably connectable to the gas exit of the boiler 86. Such scrubber 120 also will remove any soot particles should such be formed in and escape from the combustion chamber 18.

In addition to particulate matter, the products of combustion of some fuels may contain corrosive material, e.g., hydrogen sulfide, sulphur, sulphur oxides, nitrous oxides, etc., which should be removed from the combustion gases before injection to avoid corrosion of the well casing as well as of other metal ducts through which the gases may be passed prior to injection. To remove these corrosive materials, the combustion gases are next passed through gas clean-up apparatus desirably in the form of a conventional catalytic converter 122 of the iron oxide regenerating type. The converter 122 is in the form of a portable module detachably connectable to the gas exit of the scrubber 120. Preferably the scrubber 120 is connected into the system upstream of the gas clean-up apparatus 122 to avoid any build-up of particulate material in such apparatus. It will be realized, however, that both the scrubber 120 and clean-up apparatus 122 may be connected into the system upstream of the boiler 86 to avoid any build-up of particulate matter therein and corrosion thereof by corrosive material in the gases.

Although the boiler 86 extracts heat from the combustion gases and although the gases will lose more heat in traversing the scrubber 120, their temperature on leaving the clean-up apparatus 122 still may be above the maximum permitted for down-hole injection, as described above. Accordingly, on leaving the clean-up apparatus 122, the gases are conducted through a gas cooler 124, which may be of a conventional water-cooled type, to reduce the temperature of the gases to any desired level below the maximum permissible injection temperature. Again, the gas cooler 124 is in the form of a portable module detachably connectable to the gas exit of the clean-up apparatus 122.

As mentioned above, one or more of the several succession modules, e.g., boiler 86, scrubber 120, catalytic converter 122 and gas cooler 124, may not be needed in the system for any one application depending on the fuel available and the injection requirements of the oil field. On the other hand, the fuel available and the injection requirements may vary during a particular enhanced recovery operation. Accordingly, all, some or none of the several succession modules may be needed at various times during such an operation. Thus, in order to avoid disassembly of one or more of such modules from the system when not needed, all may be included in the system but each and any may be selectively by-passed by conducting the combustion gases through by-pass ducts 126 having shut-off valves 128 therein. Shut-off valves 130 are also provided in the module-connecting ducts upstream and downstream of the points of connection of the by-pass ducts 126. By appropriate opening and closing of the valves 128, 130 any module may be connected into the system for passage of the combustion gases therethrough or disconnected and by-passed by the gases.

As mentioned before, steam injection sometimes causes problems of formation pore blockage by condensation. For this reason, and depending on the particular field, it may be desirable to insure that the injected gases contain no moisture, not even the small amount introduced by the flame-cooling water. Accordingly, after passage through the cooler 124, the gases may be conducted through a conventional gas dryer 132 of portable modular construction detachably connectable to the gas exit of the cooler 124 by a conduit 134 having a shut-off valve 136 therein.

Depending on the nature of the field and the pressure injection requirements thereof, it may be desirable to boost the pressure of the cleaned, cooled and dried combustion gases with a conventional compressor 138 prior down-hole injection. The compressor 138 is in the form of a portable module detachably connectable to the gas exit of the dryer 132 by a duct 140. From the compressor 138, the gases are injected down hole as at 142.

The system also lends itself to selective injection of nitrogen or carbon dioxide. For this purpose, a conventional $CO_2$ absorber 144 is detachably connectable in parallel with a portion of the conduit 134 by inlet and outlet ducts 146, 148 having shut-off valves 150, 152 therein. The absorber 144 is constructed in the form of a portable module. For injection of $N_2$ the valve 136 is closed and the valves 150, 152 opened to allowed the scrubbed, cleaned, and cooled combustion gases to flow through the absorber 144 wherein $CO_2$ is removed and $N_2$ allowed to flow to the compressor 138.

It is, of course, desirable to recover the $CO_2$ and for this purpose the $CO_2$-absorbing liquid is recirculated, by pumps 154, 156 and connecting lines 158, 160, from the absorber 144 through a conventional $CO_2$ stripper 162 which frees the absorbed $CO_2$ from the absorbing liquid. The freed $CO_2$ is conducted from the stripper 162 to storage through a conduit 164 having a pump 166 and a shut-off valve 168 therein.

In the event it is desired to inject only $CO_2$, the valve 168 is closed and a valve 170 in a nitrogen take-off line 172 is opened. The take-off line 172 may be used to conduct nitrogen to another well for injection therein or to allow $N_2$ to escape to atmosphere. The valve 168 in the $CO_2$ storage line is then closed and a valve 174 opened in a line which delivers $CO_2$ from the stripper 162 to the conduit 134 in advance of the dryer 132.

The system of this invention is particularly useful for enhancing the recovery of hydrocarbons, especially heavy crudes, a part of which comprises gaseous components which contain highly undesirable corrosive and/or noxious compounds. Presently recovery of such hydrocarbons is enhanced by steam injection with the gaseous components from producing wells being flared, but this gives rise to air pollution problems. With the present system, however, such gaseous components may be used to fuel the reactor 10, with the undesirable compounds being subsequently eliminated by the scrubber 120 and catalytic converter 122. For this purpose the reactor desirably is operated at low pressure with the gaseous pollutants from producing wells enhanced by steam flooding being collected, condensed, and dried before being used to fuel the reactor 10.

The system of this invention also is particularly useful for enhancing the recovery of hydrocarbons by various methods. For example, $CO_2$ generated by the system can be separated and injected as a slug at pressures and temperatures necessary to achieve miscibility with the crude oil, the slug then being driven through the oil bearing formation with pressurized nitrogen generated by the system. Immiscible $CO_2$ flooding of oil bearing formations can also be conducted with the system, the $CO_2$ being injected at immiscible pressures and at various temperatures along with intermittent injection of water or suitable chemical slugs to improve recovery.

As mentioned before, the system lends itself to the generation of a mixture of nitrogen and $CO_2$ which can be injected, without separation, at various temperatures and pressures to enhance recovery. Recovery can be further improved by intermittent injection of water or suitable chemical slugs.

A particular use of the system is to generate combustion gases, mainly $N_2$ and $CO_2$, at low pressures, separate the $CO_2$ and vent the nitrogen to atmosphere at low pressure. The separated $CO_2$ is then compressed for injection. Steam generated in the system can be used for power to compress the fuel and air for the reactor 10 and also to compress the separated $CO_2$. This use of the system results in a self-balancing $CO_2$ generator with high operating efficiency.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

We claim:

1. A modular system for generating fluids at high temperatures and high pressures for selective injection into subterranean formations to enhance recovery of hydrocarbons and other fluids therefrom, comprising:
   portable means defining a pressure-tight combustion reactor provided with burner means adapted to have fuel and air supplied under high pressure thereto for the creation of combustion gases at high temperatures and high pressures in said reactor;
   portable means defining a steam boiler detachably connectable to said combustion reactor for the passage therethrough of, and heating thereof by, the high temperature high pressure combustion gases created in said combustion reactor to generate steam for selective injection into the formation with or alternatively to the gases, or for alternate use to produce power; and
   means connected to said reactor and to said boiler for selectively injecting into the formation such steam and gases separately or together.

2. A modular system for generating fluids at high temperatures and high pressures for injection into subterranean formations to enhance recovery of hydrocarbons and other fluids therefrom, comprising:
   portable means defining a pressure-tight combustion reactor provided with burner means adapted to have fuel and air supplied under high pressure thereto for the creation of combustion gases at high temperatures and high pressures in said reactor;
   portable means detachably connectable to said combustion reactor for separating carbon dioxide and nitrogen from the gases for selective injection of carbon dioxide or nitrogen into the formation; and
   means connected to said separating means for selectively injecting into the formation such carbon dioxide and nitrogen separately or together.

3. The system defined in claim 2 in which the separating means includes a carbon dioxide absorber and a carbon dioxide stripper.

4. The system defined in claim 2 including portable scrubber means detachably connectable between the reactor and the separating means for receiving and removing particulate matter from the gases prior to injection into the formation.

5. The system defined in claim 4 including means for selectively by-passing the gases around the scrubber means.

6. The system defined in claim 4 including portable means detachably connectable in series with the scrubber means for receiving and catalytically removing undesirable impurities from the gases leaving substantially only nitrogen and carbon dioxide.

7. The system defined in claim 4 including portable means detachably connectable between the reactor and the separating means for receiving and catalytically removing undesirable impurities from the gases leaving substantially only nitrogen and carbon dioxide.

8. The system defined in claim 7 including means for selectively by-passing the gases around the impurity removing means.

9. The system defined in claim 4 including portable means detachably connectable between the reactor and the separating means for cooling the gases.

10. The system defined in claim 9 including means for selectively by-passing the gases around the cooling means.

11. The system defined in claim 4 including portable means detachably connectable to the separating means for compressing the gases prior to injection.

12. The system defined in claim 4 in which the separating means includes a carbon dioxide absorbent and a carbon dioxide stripper.

13. A process for enhancing the recovery of hydrocarbons and other fluids from an underground formation, the steps comprising:
   generating combustion gases at high pressures and temperatures;
   removing impurities from the gases leaving essentially only carbon dioxide and nitrogen therein;
   injecting the purified gases at high pressures and temperatures into the formation;
   recovering liquid and gaseous hydrocarbons and gaseous impurities from the formation resulting from the heating thereof by and dissolution thereinto of the injected gases;
   separating the liquid and gaseous components of the recovery; and
   burning at least one of the separated components to generate the combustion gases.

14. A process for enhancing the recovery of hydrocarbons and other fluids from an underground formation, the steps comprising:
   generating combustion gases at high pressures and high temperatures;
   passing the gases through a heat exchanger type boiler to generate steam with the heat of the gases;
   removing impurities from the gases leaving essentially only carbon dioxide and nitrogen;
   selectively injecting the steam and/or at least a portion of the purified gases into the formation;
   venting any remainder of the purified gases to atmosphere;

recovering liquid and gaseous hydrocarbons and gaseous impurities from the formation resulting from the injection;

separating the liquid and gaseous components of the recovery; and burning at least one of the components to generate the combustion gases.

15. A process for enhancing the recovery of hydrocarbons and other fluids from an underground formation, the steps comprising:

generating combustion gases at high pressures and temperatures comprising mainly carbon dioxide and nitrogen;

separating the carbon dioxide from the nitrogen;

injecting the separated carbon dioxide, as a slug, into the formation at temperatures and pressures necessary to achieve miscibility with the hydrocarbons therein; and injecting the separated nitrogen into the formation at a pressure sufficient to drive the slug therethrough.

16. The process defined in claim 15 including the step prior to the separating step of removing impurities from the gases leaving essentially only carbon dioxide and nitrogen therein.

17. A process for enhancing the recovery of hydrocarbons and other fluids from an underground formation, the steps comprising:

generating combustion gases at high pressures and temperatures comprising mainly carbon dioxide and nitrogen;

separating the carbon dioxide from the nitrogen;

injecting the separated carbon dioxide into the formation at pressures and temperatures insufficient to achieve miscibility with the hydrocarbons therein; and injecting the separated nitrogen into the formation at a pressure sufficient to drive the injected carbon dioxide therethrough.

18. The process defined in claim 17 including the step prior to the separating step of removing impurities from the gases leaving essentially only carbon dioxide and nitrogen.

19. The process defined in any one of claims 15, 16, 17, or 18 including the formation to improve recovery.

20. A process for enhancing the recovery of hydrocarbons and other fluids from an underground formation, the steps comprising:

generating combustion gases under pressure at high temperatures comprising mainly carbon dioxide and nitrogen;

generating steam with the heat of the combustion gases;

compressing the combustion air and fuel to generate the gases with power provided by the steam;

separating the carbon dioxide from the gases;

venting the remaining gases to atmosphere; and compressing the separated carbon dioxide for injection into the formation with power provided by the steam.

21. The process defined in claim 20 including the step prior to the separating step of removing impurities from the gases leaving essentially only carbon dioxide and nitrogen therein.

22. A modular system for generating fluids at high temperatures and high pressures for selective injection into subterranean formations to enhance recovery of hydrocarbons and other fluids therefrom, comprising:

portable means defining a pressure-tight combustion reactor provided with burner means adapted to have fuel and air supplied under high pressure thereto for the creation of combustion gases at high temperatures and high pressures in said reactor;

portable means defining a steam boiler detachably connectable to said combustion reactor for the passage therethrough of, and heating thereof by, the high temperature high pressure combustion gases created in said combustion reactor to generate steam for selective injection into the formation with or alternatively to the gases, or for alternate use to produce power;

portable means detachably connectable to said steam boiler for receiving therefrom the combustion gases and for separating carbon dioxide and nitrogen from the gases; and means connected to said boiler and said separating means for selectively injecting into the formation said fluids, steam, carbon dioxide and nitrogen, separately or in combination of two or three of such fluids.

23. The system defined in claim 22 including means for selectively by-passing the gases around the boiler.

24. The system defined in claim 22 including portable scrubber means detachably connectable between the steam boiler and the separating means for receiving and removing particulate matter from the gases prior to injection into the formation.

25. The system defined in claim 24 including means for selectively by-passing the gases around the scrubber means.

26. The system defined in claim 24 including portable means detachably connectable in series with the scrubber means for receiving and catalytically removing undesirable impurities from the gases leaving substantially only nitrogen and carbon dioxide.

27. The system defined in claim 22 including portable means detachably connectable between the steam boiler and the separating means for receiving and catalytically removing undesirable impurities from the gases leaving substantially only nitrogen and carbon dioxide.

28. The system defined in claim 27 including means for selectively by-passing the gases around the impurity removing means.

29. The system defined in claim 22 including portable means detachably connectable between the boiler and the separating means for cooling the gases.

30. The system defined in claim 29 including means for selectively by-passing the gases around the cooling means.

31. The system defined in claim 22 including portable means detachably connectable to the separating means for compressing the gases prior to injection.

32. The system defined in claim 22 in which the separating means includes a carbon dioxide absorber and a carbon dioxide stripper.

* * * * *